March 26, 1957 R. Q. ARMINGTON ET AL 2,786,724
TRACK SUSPENSION
Filed Jan. 7, 1955 4 Sheets-Sheet 1

INVENTORS
Raymond Q. Armington,
John P. Carroll,
Janis Mazzarins &
Russell C. Williams.
BY Paul Fitzpatrick
ATTORNEY

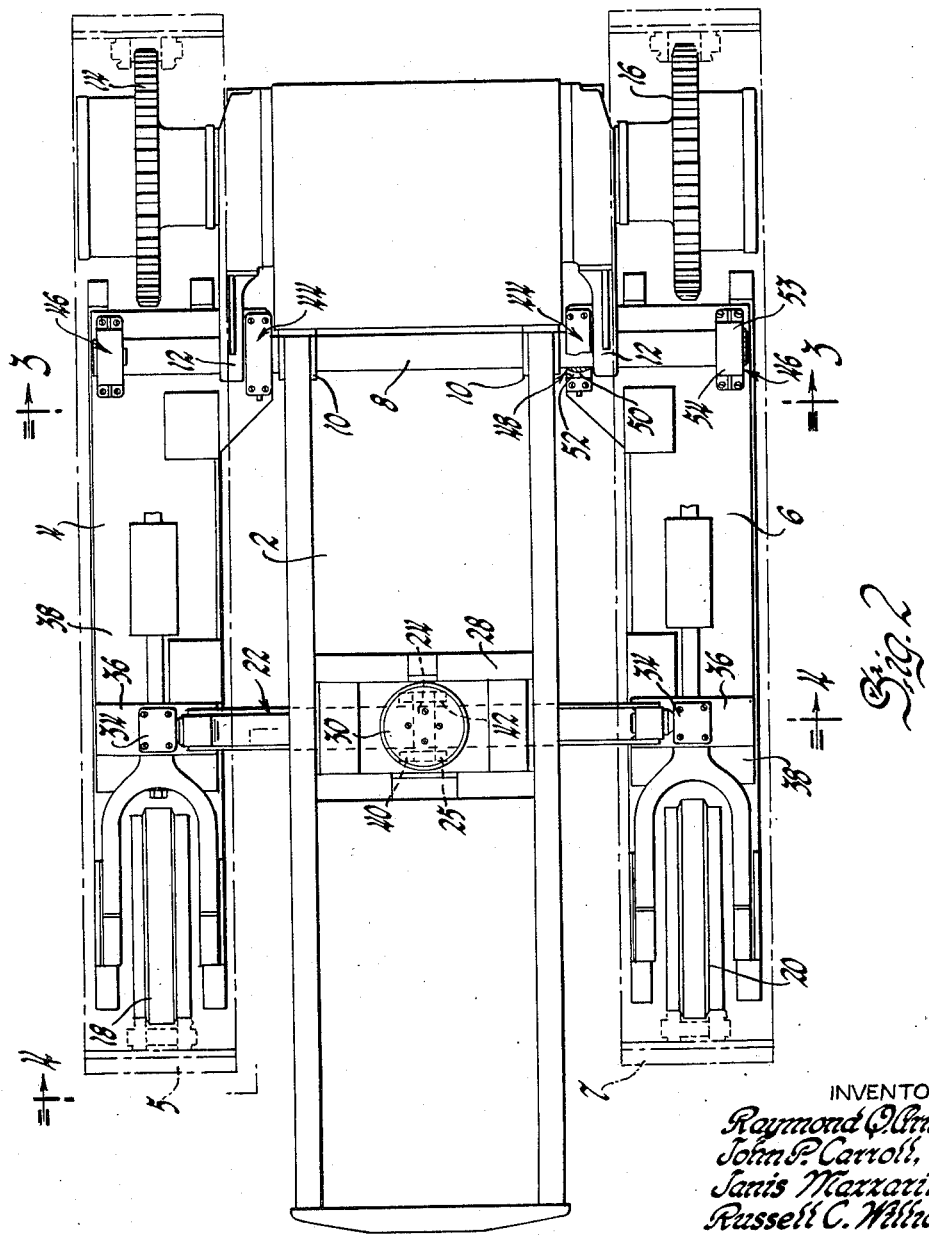

March 26, 1957 R. Q. ARMINGTON ET AL 2,786,724
TRACK SUSPENSION
Filed Jan. 7, 1955. 4 Sheets-Sheet 3
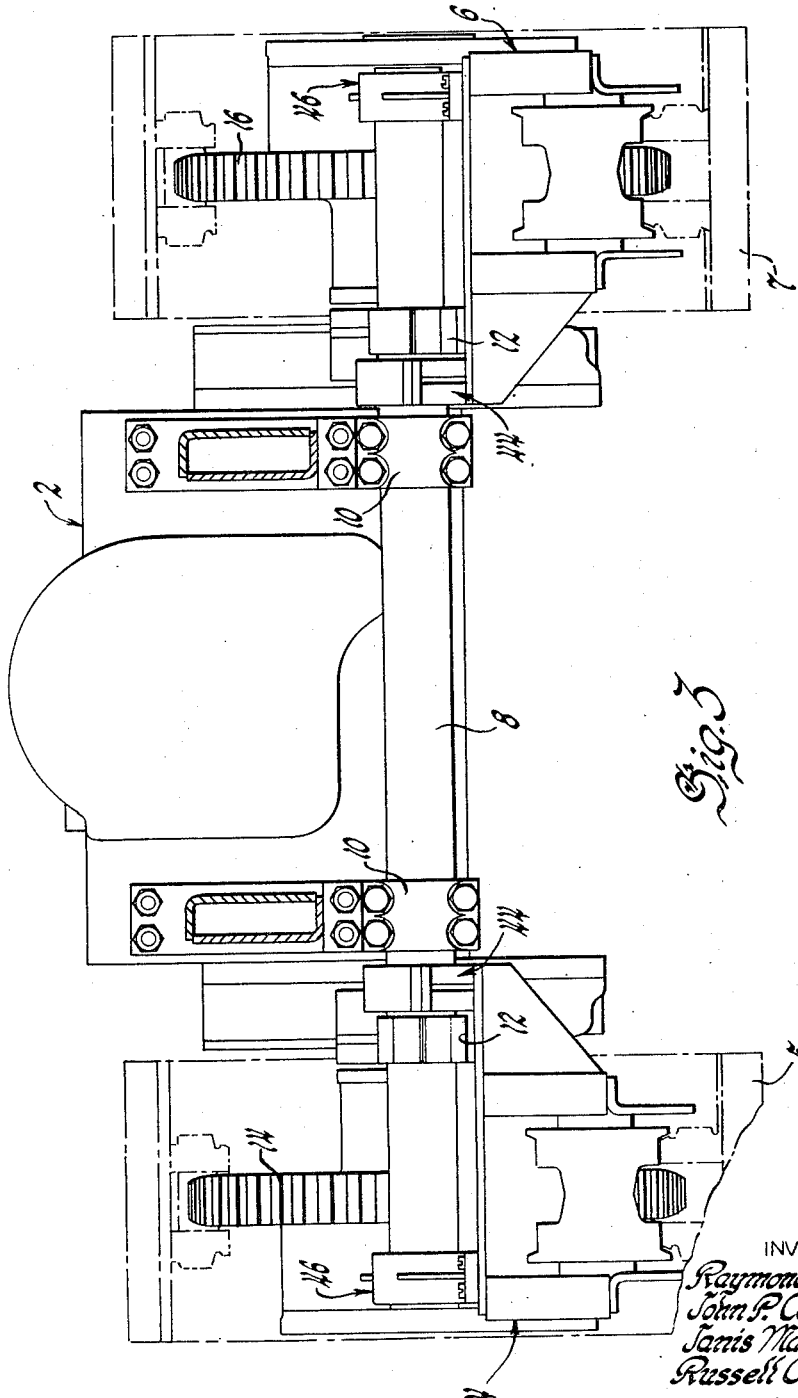

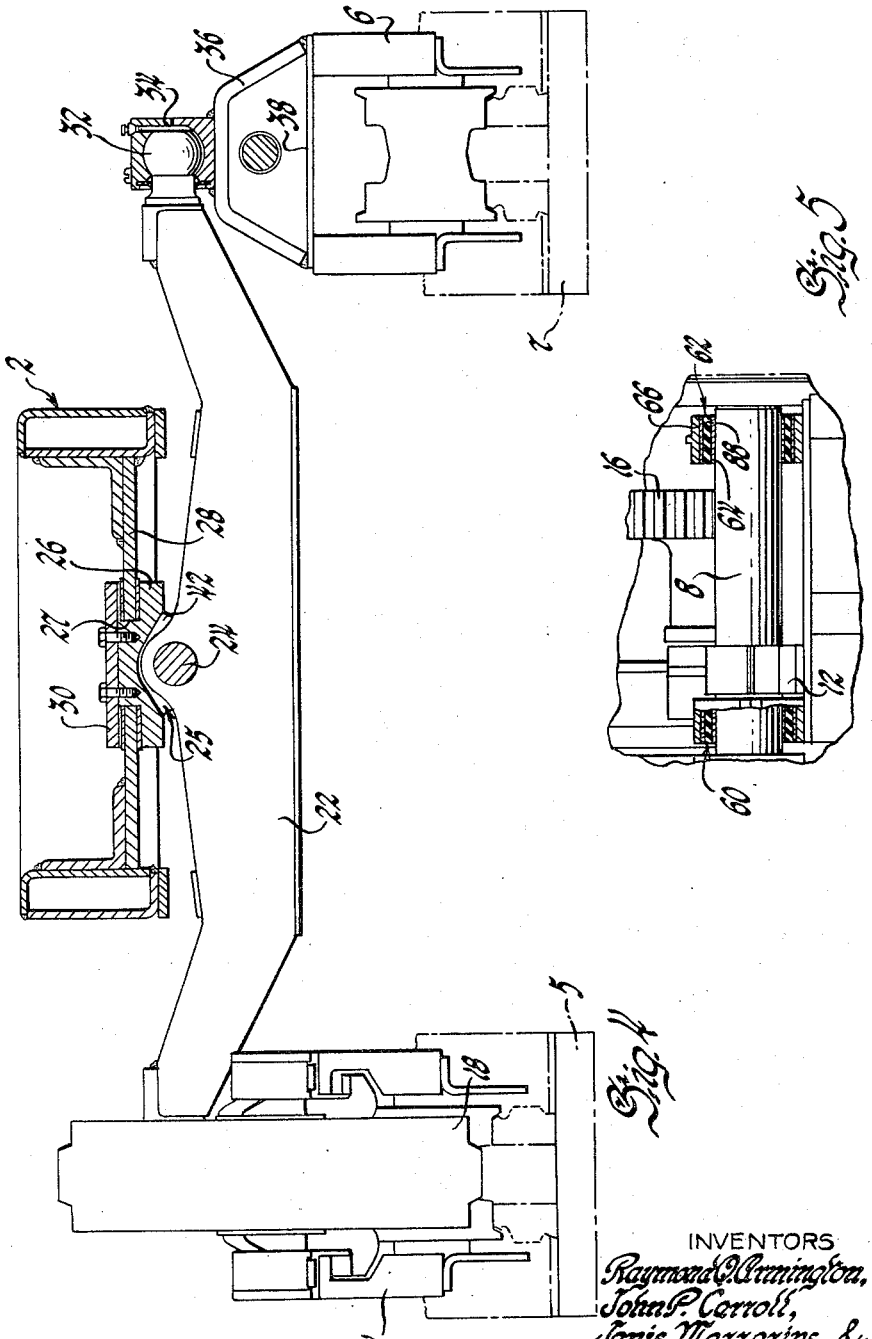

United States Patent Office 2,786,724
Patented Mar. 26, 1957

2,786,724

TRACK SUSPENSION

Raymond Q. Armington, Shaker Heights, John P. Carroll, Fairview Park, Janis Mazzarins, Cleveland, and Russell C. Williams, Rocky River, Ohio, assignors to General Motors Corporation, Detroit, Mich., a corporation of Delaware Application January 7, 1955, Serial No. 480,468

6 Claims. (Cl. 305—9)

This invention relates to tracked vehicles, and particularly to suspension structure therefor.

In accordance with the general features of the invention there is provided a crawler tractor having a suspension system wherein laterally spaced apart ground engaging endless tracks are mounted for vertical swinging movement about a common dead axle which is rigidly fixed to and extends transversely of the tractor frame and body, there being a transverse equalizer bar pivotally mounted forwardly of the dead axle on the longitudinal axis of the vehicle and having its opposite ends positively secured to the respective track frames to support the forward portion of the tractor and prevent uncontrolled angular spreading of the tracks during movement of the vehicle.

In accordance with one feature of the invention, the track frames are pivotally secured to the dead axle by means of laterally spaced bearing structures, one of which permits both lateral and vertical swingable movement of the track frame while the other permits both sliding and vertical swingable movement of the frame, thereby allowing each track to toe-in slightly during swinging movement above and below the normal horizontal level and thereby follow the path dictated by the arcuate path of the outer ends of the transverse equalizer bar.

In accordance with another feature of the invention, the equalizer bar is mounted centrally on the tractor frame in a manner permitting vertical and horizontal swinging movement and a limited degree of fore-and-aft bodily movement, the latter being sufficient to accommodate fore-and-aft shifting of the bar required by the vertical arcuate path described by the tracks during rising or falling thereof above and below the normal horizontal position.

In accordance with a modified form of the invention, resilient bushings are interposed between the spaced bearings of the tracks and the pivot shaft to yieldably permit limited toe-in of the tracks during vertical swinging movement thereof.

An object of the invention is to provide a track suspension of the stated character wherein drawbar pull is more evenly distributed between the front and rear tractor.

Another object is to provide a suspension of the type referred to wherein the individual tracks are maintained positively in substantial parallelism regardless of the relative elevation thereof.

Yet another object is to provide a track suspension having track pivoting structure capable of permitting limited controlled angular spreading of the tracks without imparting significant stresses on the pivot shaft.

These and other objects and advantages of the invention will become more fully apparent as reference is had to the accompanying specification and drawings wherein:

Fig. 2 is a plan view of the crawler tractor structure, certain parts being broken away and in dotted lines to more clearly illustrate the invention;

Fig. 3 is a front elevational, sectional view looking in the direction of arrows 3—3 of Fig. 2, showing the form and arrangement of the pivot shaft and bearing structure;

Fig. 4 is a front elevational view partly in section looking in the direction of arrows 4—4 of Fig. 2 illustrating the form and arrangement of the equalizer bar; and Fig. 5 is a view similar to Fig. 3 showing a modified form of pivot shaft bearing construction.

Figure 1:
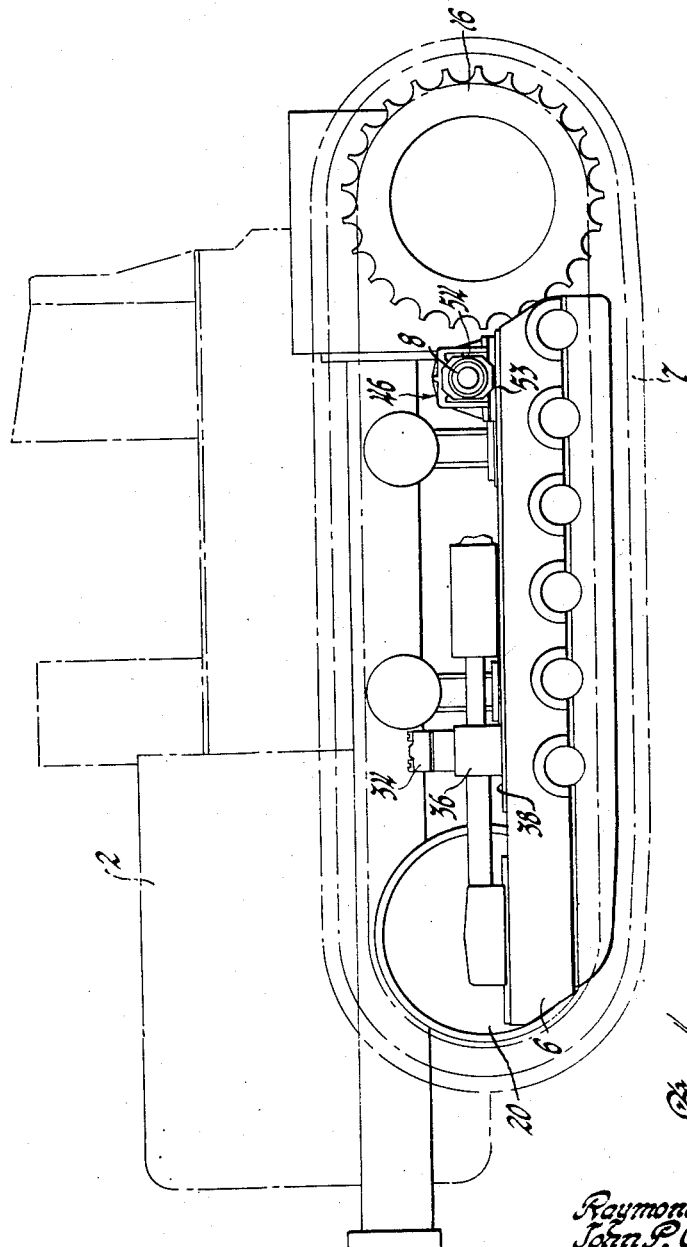
Fig. 1 is a side elevational view of a crawler tractor embodying the invention.

Referring now to the drawings and particularly Figs. 1 and 2, there is illustrated a tracked vehicle wherein the reference numeral 2 indicates generally a tractor frame and body structure. Disposed at opposite sides of tractor 2 are a pair of laterally aligned longitudinally extending track frame assemblies 4 and 6, having endless ground engaging track 5 and 7 disposed therearound. Since the precise construction of assemblies 4 and 6 form no part of the present invention, a detailed description thereof will be omitted. For a detailed description of a similar form and construction of track frame assembly, reference may be had to the copending application Serial No. 456,000, R. C. Williams, entitled Track Roller Assembly, assigned to General Motors Corporation. As seen best in Fig. 1 track frame assemblies 4 and 6 are mounted for vertical swinging movement on the opposite ends of a transversely extending pivot shaft 8, the midportion of which is rigidly secured to tractor frame assembly 2 by means of laterally spaced clamp structures 10 and 12. As will be seen in Fig. 2, pivot shaft 8 is aligned in parallel relation with the axis of rotation of track driving sprockets 14 and 16. Sprockets 14 and 16 are rotatably supported at opposite sides of tractor frame structure 2 in longitudinal alignment with the respective track frames 4 and 6 and may be driven in the conventional manner. Accordingly, only the track frame assemblies 4 and 6 and associated idler wheels 18 and 20 swing vertically about pivot shaft 8 as the vehicle progresses over irregular terrain.

In order to support the forward end of the tractor frame and body structure 2 in a normal horizontal position as well as prevent uncontrolled angular spreading and converging of the forwardly extending track assemblies there is provided a transversely extending equalizer bar 22 which is pivotally connected at its midportion on a longitudinally extending pivot shaft 24 carried by the tractor. Pivot shaft 24 is mounted in a depending clevis structure 25 formed on a turntable structure 26 which, in turn, is rotatably mounted in a circular aperture 27 formed in cross frame member 28 approximately midway between the front and rear of the tractor frame. As seen best in Figs. 2 and 4, turntable 26 is retained in aperture 27 by a cooperating circular plate 30 which overlaps aperture 27 and is bolted to turntable 26.

At its opposite ends, equalizer bar 22 is provided with integral ball portions 32 which are operatively connected in socket structures 34. Socket structures 34, in turn, are rigidly connected to upwardly offset brackets 36 which are connected, as by welding, to the top surface 38 of track frames 4 and 6. It will thus be seen that lateral spacing between the forward ends of each track 4 and 6 is positively maintained since equalizer bar 22 prevents any separation or convergence. Since either rising or falling of track assemblies 4 or 6 from the normal horizontal level position requires bodily longitudinal rearward displacement of equalizer bar 22, means are provided in the turntable structure 26 to permit bodily longitudinal sliding movement of the equalizer bar without interfering with either vertical or horizontal swinging movement thereof. As seen best in Figs. 2 and 4, clevis structure 25 of turntable 26 is provided with opposed inner wall portions 40 and 42 providing longitudinal spacing greater than the thickness of equalizer bar 22. Consequently, the latter is permitted to move bodily on pivot shaft 24 to accommodate swinging movement of the track assemblies.

Since the equalizer structure induces a small degree of toe-in of the track assemblies, when the latter either rise or fall, it will be apparent that a certain degree of stress would be imposed on the transverse pivot shaft 8 about which the track assemblies swing. In order to eliminate such stresses in accordance with the present invention, each of the track assemblies 4 and 6 are pivotally secured to the shaft 8 by means of spaced bearing structures 44 and 46. Bearing structure 44 is provided with a bearing element 48 having a semi-spherical outer surface 50 which is frictionally retained in a bearing cage 52. Cage 52, in turn, is rigidly secured to the track frame. Because of the semi-spherical outer configuration of element 48, bearing structure 44 functions to a limited extent as a ball joint and permits both vertical swinging movement of the track frame and limited horizontal swinging movement thereof without imparting stresses on shaft 8. Bearing structure 46, in turn, is located adjacent the outer extremity of shaft 8 and is provided with a sliding block bearing element 53 which is capable of limited longitudinal sliding movement in bearing cage 54. Consequently, any horizontal swinging movement of the track frames induced by stabilizer bar 22 causes the track frames to swing in a horizontal arc about a point located at the center of bearing structure 44 which, in turn, causes sliding block bearing 53 to move in the cage 54 a sufficient distance to compensate for the arcuate movement of tracks 4 and 6 about bearing structure 44. It will, of course, be understood that the inner periphery of both bearing members 48 and 53 embrace the shaft 8 and therefore permit vertical swinging movement of the tracks about the axis of bar 8 irrespective of momentary changes in horizontal angularity of the track.

In Fig. 5, there is illustrated a modification of the invention wherein large diameter rubber bushing structures 60 and 62 are substituted for bearing elements 48 and 53. Each bushing 60 and 62 is formed of concentric inner and outer tubular members 64 and 66 having a compressed resilient body 68 disposed therebetween. It has been found that by providing suitable flexible intermediate resilient bodies 68 in the bushings, only very slight stresses will be imposed upon pivot shaft 8 as a result of horizontal angular movement of the track assemblies. In addition, the modified form has the further advantage of eliminating positively shifting cooperating elements and therefore substantially reduces the necessity for frequent adjustment or replacement of parts under field conditions, lubrication, etc.

From the foregoing it will be seen that a novel and simplified track suspension system has been devised. It will be noted that no resilient elements are utilized in the present suspension, whereas in the prior art it has been customary to suspend the forward portion of the tractor on a transversely extending leaf spring, the outer ends of which rest on the respective track frames. In this connection has been found that by providing an equalizer construction of the type embodied in the present invention, springing is not only unnecessary but presents the disadvantage of permitting free upward vertical movement of the forward portion of the tractor at least to a limited extent. Hence, in prior art vehicles, there has been a tendency toward uneven weight distribution on the ground engaging tracks since in such vehicles the front end is free to lift when a load is imposed on the drawbar at the rear of the vehicle. It will be apparent in the present invention that up and down swinging movement of the front of the tractor will be distributed equally between the front and rear of the tracks.

While the embodiments of the invention as herein disclosed constitute preferred forms, it is to be understood that other forms might be adopted, all coming within the scope of the claims which follow.

We claim:

1. In a crawler tractor, the combination of a main frame, track frames at either side of said main frame, a transversely extending pivot shaft rigidly connected to said main frame, laterally spaced bearing means connecting one end of each of said track frames to said shaft for vertical swinging movement relative to said main frame, a transversely extending equalizer bar pivotally connected at its midportion on a longitudinal axis at the forward end of said main frame, means connecting one end of said bar to one of said tracks and the other end of said bar to the other of said tracks to maintain said tracks in positive spaced relation during rise and fall thereof, and means associated with said spaced bearing means permitting limited horizontal angular movement of said tracks during rise and fall thereof without imparting stresses to said pivot shaft.

2. In a crawler tractor, the combination of a main frame having a transversely extending pivot shaft rigidly connected thereto near one end thereof, a pair of generally parallel track frame assemblies disposed at opposite sides of said main frame, laterally spaced bearing means mounted on said frame assemblies connecting the latter to said pivot shaft for vertical swinging movement thereon, a transversely extending equalizer bar spaced longitudinally from said pivot shaft and connected to said main frame and said track frames in a manner causing limited positive toe-in of the latter during rise and fall thereof from a normal horizontally aligned position, and resilient means interposed between said tracks and said pivot shaft to absorb horizontal angular movement resulting from toe-in of said frame assemblies without imparting bending stresses to said pivot shaft.

3. In a crawler tractor, the combination of a main frame having a transversely extending pivot shaft rigidly connected thereto near one end thereof, a pair of generally parallel track frame assemblies disposed at opposite sides of said main frame, laterally spaced bearing means mounted on said frame assemblies connecting the latter to said pivot shaft for vertical swinging movement thereon, a transversely extending equalizer bar spaced longitudinally from said pivot shaft and connected to said main frame and said track frames in a manner causing limited positive toe-in of the latter during rise and fall thereof from a normal horizontally aligned position, and means associated with said bearing means for absorbing horizontal angular movement resulting from toe-in of said frame assemblies without imparting bending stresses to said pivot shaft.

4. In a crawler tractor, a main frame, a pair of track driving sprockets rotatably supported on said frame at opposite sides thereof, a transversely extending pivot shaft rigidly connected to said frame in parallel relation with the axis of rotation of said drive sprockets, a pair of track assemblies disposed at opposite sides of said main frame in longitudinal alignment with the respective drive sprockets, laterally spaced portions on each of said track assemblies connecting the latter to said pivot shaft, said spaced portions including bearing elements adapted to permit both vertical and limited horizontal swinging movement of said assemblies relative to said shaft, an equalizer bar adapted to support the portion of said main frame ahead of said pivot shaft, and a universal joint at each end of said equalizer, portions of each of said joints being rigidly connected to said track assemblies whereby lateral spacing between said assemblies is positively maintained between narrow predetermined limits.

5. In a crawler tractor, a main frame, a pair of track driving sprockets rotatably supported on said frame at opposite sides thereof, a transversely extending pivot shaft rigidly connected to said frame in parallel relation with the axis of rotation of said drive sprockets, a pair of track assemblies disposed at opposite sides of said main frame in longtudinal alignment with the respective drive sprockets, laterally spaced portions on each of said track assemblies connecting the latter to said pivot shaft, said spaced portions including bearing elements adapted to permit both vertical and limited horizontal swinging movement of said assemblies relative to said shaft, an equalizer bar adapted to support the portion of said main frame ahead of said pivot shaft, and a universal joint at each end of said equalizer, portions of each of said joints being rigidly connected to said track assemblies to prevent uncontrolled horizontal spreading and convergence of said tracks during rise and fall thereof.

6. In a crawler tractor, a main frame, a pair of track driving sprockets rotatably supported on said frame at opposite sides thereof, a transversely extending pivot shaft rigidly connected to said frame in parallel relation with the axis of rotation of said drive sprockets, a pair of track assemblies disposed at opposite sides of said main frame in longitudinal alignment with the respective drive sprockets, laterally spaced portions on each of said track assemblies connecting the latter to said pivot shaft, said spaced portions including a first bearing element permitting limited universal movement and a second bearing element permitting vertical swinging movement and limited horizontal sliding movement of said assemblies relative to said shaft, an equalizer bar adapted to support the portion of said main frame ahead of said pivot shaft, and a universal joint at each end of said equalizer, portions of each of said joints being rigidly connected to said track assemblies whereby lateral spacing between said assemblies is positively maintained between narrow predetermined limits.

References Cited in the file of this patent

UNITED STATES PATENTS

| | | |
|---|---|---|
| 1,258,602 | Turnbull | Mar. 5, 1918 |
| 1,376,286 | Lingard | Apr. 26, 1921 |
| 1,439,236 | Harris | Dec. 19, 1922 |
| 1,474,918 | Schneider | Nov. 20, 1923 |
| 1,522,157 | Tracy | Jan. 6, 1925 |
| 1,940,795 | Gerardi | Dec. 26, 1933 |
| 2,223,802 | Heaslet | Dec. 3, 1940 |